United States Patent

[11] 3,572,028

[72] Inventor Maurice I. Taylor
    Allestree, England
[21] Appl. No. 858,310
[22] Filed Sept. 16, 1969
[45] Patented Mar. 23, 1971
[73] Assignee Rolls Royce Limited
    Derby, England
[32] Priority Sept. 26, 1968
[33] Great Britain
[31] 45 754/68

[54] BLADE INGESTION PREVENTION
    5 Claims, 2 Drawing Figs.
[52] U.S. Cl. .................................................. 60/39.09,
    55/306, 55/422, 244/53.8
[51] Int. Cl. .................................................. F02c 7/04,
    B64d 33/02
[50] Field of Search .................................... 60/39.09
    (DP), 39.15; 244/53.8, (Inquired); 55/306, 270,
    274, (I.C.), 422, (Inquired); 356/(Inquired);
    250/(Inquired)

[56] References Cited
    UNITED STATES PATENTS
2,944,631  7/1960  Kerry ........................... 55/306
3,042,342  7/1962  Wiles ........................... 244/53.8

Primary Examiner—Douglas Hart
Attorney—Cushman, Darby & Cushman

ABSTRACT: The invention provides an apparatus for either preventing an engine component from flying out of an engine or preventing a foreign body from entering an engine and is particularly applicable to each engine of a bank of gas turbine lift engines. The apparatus consists of detecting means which comprises a photoelectric scanner mounted centrally in the intake of a gas turbine engine and a ring of photoelectric cells spaced around the engine intake wall and a guard means which comprises a pair of part spherical gridlike shields having a power source operable by the detecting means to span the intake.

PATENTED MAR 23 1971
3,572,028
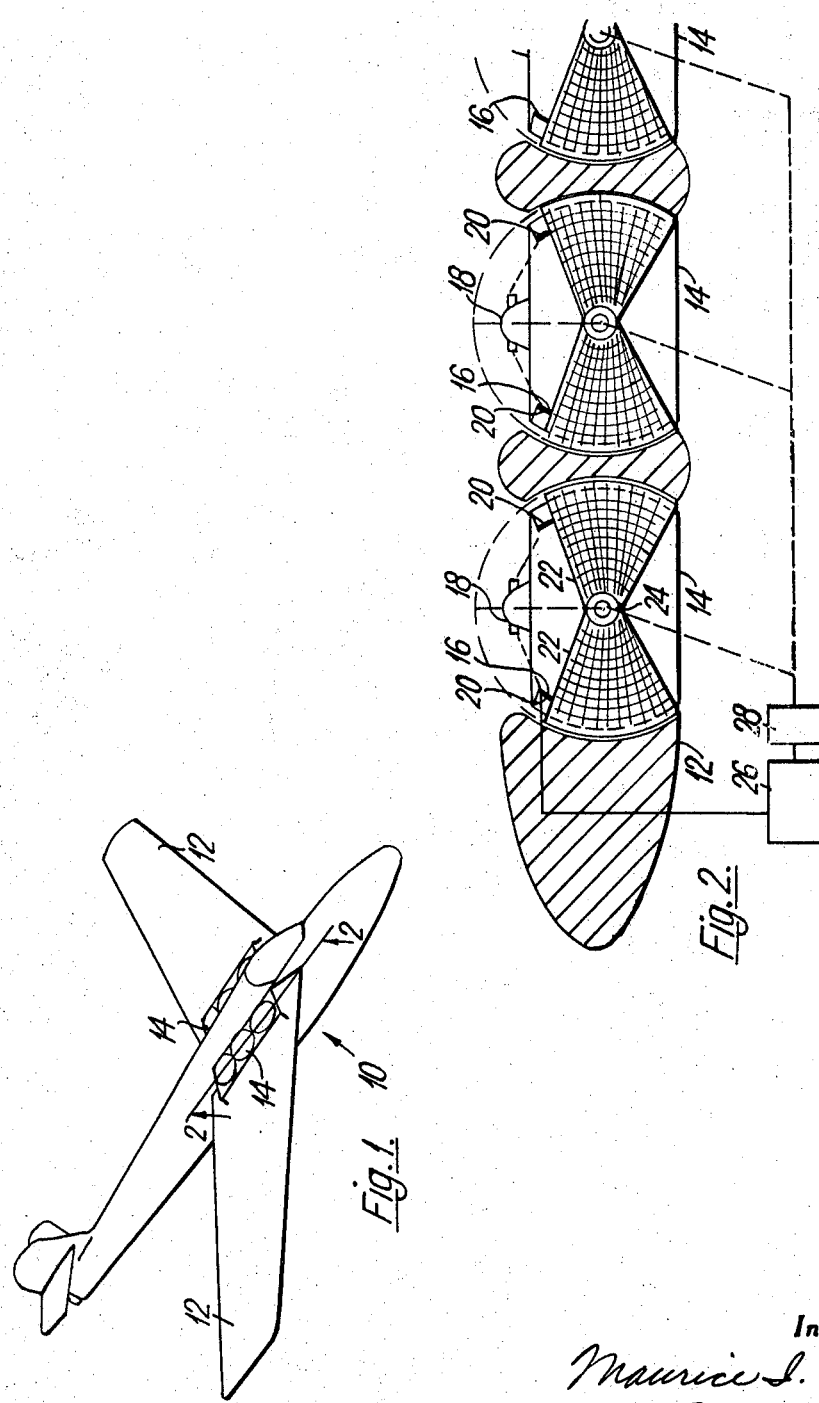
Inventor
Maurice S. Taylor
By
Cushman, Darby & Cushman
Attorneys

BLADE INGESTION PREVENTION

This invention relates to a retractable intake guard which can be used in conjunction with a gas turbine power plant.

The invention is particularly though no exclusively useful in combination with a gas turbine lift engine for VTOL aircraft. Such aircraft may be powered by a bank of lift engines and if a compressor blade in one of the engine breaks loose there is the possibility that it may enter the adjacent engine where a similar process may take place. The process may be repeated along the whole bank of engines causing serious damage. causing serious damage. The present invention seeks to provide an intake guard which will prevent such an occurrence. Whilst the invention can be used for preventing broken parts of the engine from being ejected through the intake, it can also be used for preventing the entry of foreign bodies such as birds into the engine.

The present invention provides an apparatus for preventing the passage of foreign bodies or engine components either into or out of a gas turbine engine including means to detect the passage of said bodies or components in the intake of a gas turbine engine and guard means operable by said detecting means to span the intake so as to prevent a foreign body or an engine component passing either into or out of the engine.

The detecting means may comprise a photoelectric scanner mounted on a central part of the engine or intake and photoelectric cells mounted around the periphery of the intake. The guard means may comprise two part spherical gridlike shields mounted on trunnions. The guard means may be operated by a power source such as, a spring, hydraulic or pneumatic means, the power source being arranged to operate for example by means of a solenoid actuator or explosive bolt the solenoid or explosive bolt functioning when the beam of light between the scanner and one of the cells is broken by the passage of a foreign body.

The gas turbine engine may be a lift engine which may be one of a number of lift engines mounted in a bank, each engine having apparatus according to the present invention, the closure means of each engine being operable upon detection of the passage of a foreign body in the intake of one of the engines.

The invention will now be more particularly described with reference to the accompanying drawing in which:

FIG. 1 is a perspective view of an aircraft having two banks of lift engines each engine having one form of apparatus according to the present invention; and FIG. 2 is a part diagrammatic section on line 2—2 of FIG. 1.

In the FIGS. an aircraft 10 has wings 12 and two banks of lift engines 14, each being mounted in the root of one of the wings. Each engine has an intake 16 and a compressor (not shown) and the forward end of the compressor shaft has a cowling 18. A rotatable photoelectric scanner is mounted in each cowling 18 and a number of equispaced photoelectric cells 20 are provided in the intakes 16. The light rays emitted by the scanner are so arranged and the cells are so spaced that the rays continuously energize each cell until one or more of the rays are broken by the passage of a foreign body.

Each engine has a pair of part spherical gridlike guards 22 mounted on trunnions 24 so that they are movable between a position (shown in full lines) where they do not obstruct the passage of air into the engine to position (shown in chain dotted lines) where they can contain an object ejected from the engine. Each cell 20 is connected in a circuit shown diagrammatically at 26 and the circuit is arranged to operate a power source 28 mechanically connected to each pair of guards 22.

In use, should an engine component such as a broken compressor blade be ejected from the engine, as it passes out of the intake, one or more of the rays from the rotating scanner 18 will be broken and one of the cells 20 will be deenergized. The cell circuit 26 is so arranged that this deenergization will cause the power source 28 to function and all guards will move to the closed position (chained dotted). All the guards are operated in case the first pair of guards do not catch the blade as it is ejected, since at least the other guards prevent the blade from entering the other engines.

The power source may be in the form of the energy stored in a compressed spring or an hydraulic or pneumatic ram connected by any suitable means to the guards 20. The power source may be actuated by a solenoid actuator or explosive bolt, the solenoid or explosive bolt being operated on deenergization of one of the cells 20.

The scanner 18 may be stationary and the number of rays emitted by the scanner is a function of the size of the object to be detected.

The apparatus can be arranged in the following manner to prevent the ingestion of foreign bodies, such as birds into the engine. The scanner and photoelectric cells are positioned as close to the forward end of the intake as possible and the guards are located further rearwardly and are arranged to move to a closed position behind the scanner as opposed to in front of the scanner in the illustrated embodiment. In this way, a foreign body can be prevented from entering the engine.

The invention is equally applicable to gas turbine lift engines and to gas turbine propulsion engines.

The apparatus can be arranged if so desired to operate as a noncanceling system i.e., should the guards be operated on takeoff, the pilot would land the aircraft, so that the guards could be opened and the damage inspected and corrected.

I claim:

1. Apparatus for preventing the passage of foreign bodies or engine components either into or out of a gas turbine engine having an intake, the apparatus having detecting means to detect the passage of said bodies or components in said intake and guard means having a power source operable by said detecting means to span the intake so as to prevent a foreign body or engine component from passing either into or out of the engine.

2. Apparatus according to claim 1 in which the detecting means includes a photoelectric scanner.

3. Apparatus according to claim 1 in which the detecting means includes a plurality of equispaced photoelectric cells.

4. Apparatus according to claim 1 in which the guard means includes two part spherical gridlike shields.

5. An aircraft including a bank of gas turbine lift engines, each engine having an apparatus as claimed in claim 1 in which the detecting means of any one of the apparatus is arranged to operate the guard means of all the apparatus.